3,409,576
WAX/COPOLYMER COMPOSITION

Karekin G. Arabian, Walnut Creek, Calif., assignor to Shell Oil Company, New York, N.Y., a corporation of Deleware
No Drawing. Continuation-in-part of application Ser. No. 483,351, Aug. 27, 1965. This application June 27, 1966, Ser. No. 560,873
1 Claim. (Cl. 260—28.5)

ABSTRACT OF THE DISCLOSURE

Heat sealable petroleum wax compositions having a viscosity of at least 6000 centipoises at 300° F. are obtained by incorporating about 6.5% weight of ethylene/propylene copolymer of 3.5 intrinsic viscosity and containing 85–93 mol percent ethylene units and 6.5% weight of ethylene/vinyl acetate copolymer of molecular weight between 25,000 and 90,000 and composed of ethylene and vinyl acetate units in a mol ratio of 8:1 to 14:1.

---

This application is a continuation-in-part of Ser. No. 483,351 filed Aug. 27, 1965, and now abandoned.

This invention relates to wax-containing coating compositions and particularly to wax coating compositions containing mixtures of polymeric materials, which compositions have physical properties superior to wax coating compositions containing single polymeric materials.

Petroleum-derived waxes have been used for many years to coat paper and carton boards especially for use in wrapping and containing dairy products and other food products such as bakery goods as well as for coating cloth, fibers, and food products including cheese and meats to render them moisture-vapor resistant. Such waxes, however, have an unfortunate tendency to crack and peel off the coated articles, especially when they are subjected to repeated flexing or severe creasing. Even waxes modified with polyethylene, while having some improved properties, show disadvantages relative to brittleness and lack of tensile strength, particularly under low-temperature conditions.

In the last few years, the disadvantages which are normally attendant to the use of wax in coating applications have resulted in the significant supplanting of wax alone by the use of polymeric coatings, e.g., polyethylene in patricular. In addition, polymeric wax reinforcing agents such as copolymers of ethylene and vinyl acetate, have also been used to some extent in attempting to overcome the inadequacies of conventional petroleum waxes. Copolymers of ethylene with $C_{3-8}$ olefins have also been found to have quite excellent wax-reinforcing properties. In addition, ethylene-vinyl acrylate copolymers, various synthetic rubbers and the like have been proposed for incorporation into wax.

Most polymer-reinforced waxes or polymers, suitable for coatings, have considerably higher viscosities than the waxes which they are intended to replace. This means, of course, that the viscosity of the resulting wax-copolymer compositions will increase as the proportion of polymer increases. Because of the low viscosity levels, i.e., 50 to 300 centipoises at 300° F., which are tolerable in conventional coating equipment, the amount of polymer which can be employed has heretofore been severely limited and as a result thereof, only minor improvements in wax-coating properties have been obtainable. Presently, with the development of coating machines which are capable of handling compositions having much higher viscosities, i.e., in excess of 6,000 centipoises at 300° F., highly viscous coating compositions having substantially improved properties can now be exploited. In fact, wax-coatings containing up to and in excess of 50% of copolymers of ethylene and vinyl acetate have now been disclosed as being useful; see U.S. 3,189,573 issued July 15, 1965. Of course, as the concentration of polymer in the coating composition increases, the cost of the composition also becomes proportionately greater.

It is, therefore, a principal object of this invention to obtain a wax-copolymer composition possessing high viscosity characteristics and related desirable physical properties without the associated prohibitively high cost presently resulting from employing ethylene-vinyl acetate copolymer alone in the wax composition. It is a further object of this invention to combine two ethylene copolymers with a petroleum wax to produce an improved heat sealable coating composition. These objects will be better understood and other objects will become more apparent from the description of the invention as given hereinafter.

Now, in accordance with this invention, it has been found that the total amount of polymer necessary to produce a coating composition with desirable physical properties including high viscosity, can be unexpectedly reduced by incorporating two types of ethylene copolymers, i.e., ethylene-propylene copolymer (EPC) and a second ethylene copolymer, rather than a single type of copolymer, with a petroleum wax. More specifically, the ethylene copolymers which can be advantageously mixed with EPC include the copolymers of ethylene with esters of terminally unsaturated organic compounds containing 3–5 carbon atoms, preferably selected from the group consisting of esters of terminally ethylenically-unsaturated monocarboxylic acids and saturated aliphatic alcohols and esters of saturated monocarboxylic acids and terminally ethylenically-unsaturated aliphatic alcohols. Examples of such comonomers include vinyl acetate, ethyl acrylate and methyl acrylate.

It has been found preferable to employ from 5–30%, based on total weight of wax and copolymer, of a mixture of ethylene copolymers, and it is especially desirable to utilize from 10–20% of such a mixture.

The ethylene copolymers of this invention can be employed in amounts of from 25% to 75% by weight, based on the weight of the total amount of copolymers present in the wax-copolymer composition. More specifically, 40–75%, as defined above, of the copolymer of ethylene and propylene is highly advantageous, and especially preferred is 50–75%, as defined above, of the ethylene-propylene copolymer.

It has been found that a viscosity of at least 6,000 centipoises is desirable for excellent heat sealability and for excellent hot melt strength ("hot tack"). As shown in Table I, it is better to blend to about 6,000 viscosity, an ethylene/propylene copolymer of 3.5 intrinsic viscosity (I.V.) as a flexibility improver than to utilize an ethylene/propylene copolymer of 2.5 I.V. and 1.3 I.V. in two respects: (1) a much lower concentration is needed 7% vs. 22% and 26% (see Examples 1, 2 and 3 in Table I), and (2) the flexibility of the blend with 3.5 I.V. ethylene/propylene copolymer is better than the other two. The blend described as Example I in Table I is not acceptable as a commercial blend because of poor adhesion. This defect can be overcome, as shown in Example 5, when 6.5% ethylene/vinyl acetate copolymer is combined with 6.5% ethylene/propylene copolymer. The adhesion of the blend is greatly improved and a commercially useful blend with around 6,000 c.p.s. viscosity is produced at a total concentration of 13% combined copolymers. Example 6 indicates that the same excellent blends cannot be made by substituting butyl rubber for the ethylene/propylene copolymer in the three component blend (ethylene/propylene copolymer, ethylene/vinyl acetate, wax).

TABLE I.—SCREENING TESTS WITH ETHYLENE/PROPYLENE COPOLYMERS (EPC) IN WAX

| Example | Blend [1] | Brookfield Viscosity at 300° F. (cps.) | Adhesion to "Mosscote" Frozen Food Carton Stock, applied at 300° F., air-cooled, stored 24 hours at 77° F. | Flexibility of 1-2 mil thick coating, folded at score-line 180 degrees and stained with Iodine solution for 2 min. | |
|---|---|---|---|---|---|
| | | | | Folded at 77° F. | Folded at 40° F. |
| 1 | 7.5% Shell EPC (3.5 I.V.) in wax | 6,500 | Poor | Slight crack on inside; no crack on outside. | Severe cracks on inside; no crack on outside. |
| 2 | 22% Shell EPC (2.5 I.V.) in wax | 7,600 | do | Severe cracks on inside; slight crack on outside. | Severe cracks on inside and outside. |
| 3 | 26% Shell EPC (1.3 I.V.) in wax | 7,600 | do | Severe cracks on inside and outside. | Do. |
| 4 | Commercial blend, 35% ethylene/vinyl acetate copolymer (Elvax 250) in wax. | 6,800 | Excellent | No cracks on inside and outside. | No cracks on inside and outside. |
| 5 | 6.5% Shell EPC (3.5 I.V.) and 6.5% Elvax 260 in wax. | 7,640 | do | do | Slight cracks inside and outside. |
| 6 | 6.5% Polyisobutylene-L-80 and 6.5% Elvax 260 in wax. | | | This blend is so low in blocking temperature (less than 90° F.) and so poor in tensile strength and scuff resistance that it cannot be considered a suitable commercial coating. | |

[1] The wax used in all blends is a mixture of Shell Waxes 200:300:400 in 30:10:30 ratio.

Table II contains an example which indicates that the same excellent flexibility cannot be obtained where polyethylene is substituted for ethylene/propylene copolymer in the three component blend of this invention.

TABLE II

| Blend | Flexibility at 77° F. of 1 mil Coating Folded 180 Degrees on ¼" Corrugated Board and Then Stained. |
|---|---|
| 6.5% Shell EPC (3.5 I.V.) and 6.5% Elvax 260 in wax.[1] | No cracks on inside of fold. |
| 6.5% Hercules polyethylene Hifax 1600E, Melt Index=0.22 and 6.5% Elvax 260 in wax. | Severe cracks on inside of fold. |

[1] The wax used in these experiments is Shell Waxes 200:300:400 in 30:10:30 ratios.

The ethylene-vinyl acetate copolymers which are to be used in the compositions of the invention have a molecular weight up to 100,000 and preferably between 25,000 and 90,000 and correspond to the general formula

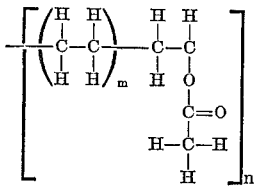

wherein $n$ ranges from about 15 to about 250. The actual occurrence of the acetate substituents along the hydrocarbon chain is of a random character and thus the letter $m$ denotes the average number of ethylene units per vinyl acetate unit in the molecule rather than the presence of regularly recurrent units having the composition given within the above brackets. The value for $m$ ranges from about 6.5 to 30 and preferably from about 8 to 14. Typical properties of ethylene-vinyl acetate copolymers which may be used in the invention are shown in Table III.

($CH_2$) is an unbranched hydrocarbon chain. The average molecular weight of the EPC copolymers may be up to about 5 million; however, it usually varies between about 20,000 and 800,000 and preferably between 200,000 and 400,000. Expressed as intrinsic viscosity, copolymer intrinsic viscosities of between about 1.0 and 6.0 enhance the physical properties of petroleum waxes, providing wax compositions with unexpectedly improved toughness, flexibility, tensile strength, elongation, resistance to cracking at low temperature and other desirable properties. Copolymers containing from 80 to 95 moles of ethylene and from 20 to 5 moles of propylene can be employed in the compositions of the invention. Preferably, the copolymers are those having between 85 to 93 mole percent ethylene and 15 to 7 mole percent propylene. The intrinsic viscosity of the copolymer is preferably between about 2 and 5 and especially between 2.5 and 4.5.

While the process of forming these copolymers does not form a part of the present invention, the copolymers may be prepared by well known procedures, such as catalytic polymerization. The proportion of catalyst should be in the order of 0.01–1%, the polymerization being carried out in an inert solvent such as an alkane (cyclohexane). Polymerization in this manner is normally conducted under low pressures in the order of 1–30 p.s.i.g. and temperatures of 0–100° C. for a time of 1–5 hours.

Catalytic systems which may be used include combinations of aluminum alkyl chlorides such as aluminum diethyl monochloride with trialkyl vanadates, exemplified by triisobutyl vanadate, or "ethyl aluminum sesquichloride" ($Al_2(C_2H_5)_3Cl_3$). Other vanadates include tri-secondary butyl vanadate or mixed isopropyl secondary butyl vanadates.

The density of the copolymers may be varied over a considerable range, usually between about 0.84 to about 1.0, low density copolymers being regarded as those having densities in the order of 0.84 to about 0.91 and high-

TABLE III.—PROPERTIES OF ETHYLENE=VINYL ACETATE COPOLYMERS

| | A | B | C | D | E | F | G | H | I | J |
|---|---|---|---|---|---|---|---|---|---|---|
| Weight Percent Vinyl Acetate | 27–29 | 27–29 | 27–29 | 27–29 | 27–29 | 24–26 | 24–26 | 24–26 | 17–19 | 17–19 |
| $C_2$/Vinyl Acetate Mole Ratio | 8/1 | 8/1 | 8/1 | 8/1 | 8/1 | 10/1 | 10/1 | 10/1 | 14/1 | 14/1 |
| Melt Index, g./10 min | 340–470 | 125–175 | 22–28 | 12–18 | 5–7 | 335–465 | 16–22 | 1.6–2.4 | 125–175 | 2.1–2.9 |
| Inherent Viscosity, 0.25 g./100 ml. Toluene at 30° C. | 0.59 | 0.63 | 0.78 | 0.85 | 0.94 | 0.54 | 0.84 | 1.05 | 0.54 | 0.98 |
| Softening Point (R and B), ° F | 180 | 190 | 250 | 280 | 310 | 190 | 280 | 370 | 210 | 390 |
| Tensile Strength, p.s.i. | 500 | 550 | 1,000 | 2,000 | 2,900 | 400 | 1,700 | 2,700 | 850 | 2,750 |
| Elongation at Break, Percent | 800 | 1,000 | 700 | 750 | 950 | 800 | 1,000 | 1,000 | 550 | 850 |
| Density, g./cc | 0.95 | 0.95 | 0.95 | 0.95 | 0.95 | 0.95 | 0.95 | 0.95 | 0.94 | 0.94 |

The ethylene-propylene copolymers which are used in the invention consist of certain polymers having the general linear configuration

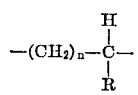

wherein $n$ is an average integer between about 10 and 50 and is preferably between 10 and 40, R is a lower alkyl radical having from 1 to 4 carbon atoms and the unit density materials being regarded as those having densities from the latter upper limit to about 1.0. Advantages are gained by the combination of several different degrees of high and low density and/or high and low molecular weight insofar as increase in low-temperature properties without a corresponding increase in brittleness being experienced.

The waxes which may be used in the invention are petroleum waxes referred to in the art as paraffin wax or as microcrystalline wax. Microcrystalline wax is also known as amorphous wax and is obtained by the dewaxing of residual lubricating oils while the paraffin waxes are usually obtained by the dewaxing of distillate lubricating oil fractions. Distillate paraffin waxes usually having melting points between about 120° F. and about 185° F., preferably between about 125 and 165° F. Microcrystalline waxes which contain only minor amounts of normal paraffins and largely predominate in highly branched and naphthenic waxes have melting points in the order of 130–180° F.

The higher melting point paraffin waxes are especially useful in many coating wax compositions: heavy distillate waxes obtained from the highest boiling distillate lubricating oil fractions by dewaxing have melting points in the order of 140 and 185° F., as does the high melting point paraffin wax split from microcrystalline wax by fractional crystallization.

Special waxes may be obtained in particular instances, such as the plastic wax obtained by the deoiling of soft wax fractions which normally are separated from paraffin waxes during deoiling and dewaxing procedures. These plastic waxes are useful for their extreme flexibility and, while useful for this particular property, are especially subject to being fortified with respect to blocking and tensile strength as well as toughness by incorporation with the subject copolymers.

It is normal experience in designing wax coating compositions to find it necessary to combine several waxes together in a single composition. The purpose of this, of course, is to obtain the beneficial properties inherent in each particular type of wax or to minimize adverse properties of other waxes so included.

I claim as my invention:
1. An improved heat-sealable petroleum wax coating composition, having a viscosity of at least 6000 centipoises at 300° F., of 87% weight of petroleum wax, 6.5% weight of a copolymer of ethylene and propylene containing 85–93 mol percent ethylene units and having an intrinsic viscosity of 3.5 and 6.5% weight of ethylene-vinyl acetate copolymer having a molecular weight of between 25,000 and 90,000 and containing ethylene and vinyl acetate units in a mol ratio of from 8:1 to 14:1.

References Cited

UNITED STATES PATENTS

| | | |
|---|---|---|
| 2,877,196 | 3/1959 | Reding. |
| 3,146,214 | 8/1964 | Jakaitis et al. |
| 3,157,610 | 11/1964 | Richardson. |
| 3,181,765 | 5/1965 | Bonzagni et al. |
| 3,189,573 | 6/1965 | Oken. |
| 3,205,186 | 9/1965 | Zaayenga. |
| 3,210,305 | 10/1965 | Coenen et al. |
| 3,227,669 | 1/1966 | Sauer. |
| 3,294,722 | 12/1966 | Apikos et al. |
| 3,303,150 | 2/1967 | Coenen et al. |

FOREIGN PATENTS

| | | |
|---|---|---|
| 634,016 | 12/1963 | Belgium. |
| 1,386,678 | 12/1964 | France. |
| 1,389,415 | 1/1965 | France. |

MORRIS LIEBMAN, *Primary Examiner.*

B. A. AMERNICK, *Assistant Examiner.*